United States Patent
Tamrakar et al.

(10) Patent No.: US 11,025,390 B2
(45) Date of Patent: Jun. 1, 2021

(54) METHOD FOR TRANSMITTING UPLINK SOUNDING REFERENCE SIGNAL, TERMINAL, NETWORK SIDE DEVICE, AND STORAGE MEDIUM

(71) Applicant: CHINA ACADEMY OF TELECOMMUNICATIONS TECHNOLOGY, Beijing (CN)

(72) Inventors: Rakesh Tamrakar, Beijing (CN); Qiubin Gao, Beijing (CN); Runhua Chen, Beijing (CN); Hui Li, Beijing (CN); Qiuping Huang, Beijing (CN); Mengjun Wang, Beijing (CN); Chuanjun Li, Beijing (CN); Yu Yang, Beijing (CN); Yang Song, Beijing (CN); Xin Su, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/324,471

(22) PCT Filed: Jul. 24, 2017

(86) PCT No.: PCT/CN2017/094141
§ 371 (c)(1),
(2) Date: Feb. 8, 2019

(87) PCT Pub. No.: WO2018/028421
PCT Pub. Date: Feb. 15, 2018

(65) Prior Publication Data
US 2019/0222369 A1  Jul. 18, 2019

(30) Foreign Application Priority Data

Aug. 12, 2016 (CN) .......................... 201610663291.1

(51) Int. Cl.
*H04L 5/00* (2006.01)
*H04B 1/713* (2011.01)
(Continued)

(52) U.S. Cl.
CPC ............. *H04L 5/005* (2013.01); *H04B 1/713* (2013.01); *H04L 5/0005* (2013.01);
(Continued)

(58) Field of Classification Search
CPC ..... H04L 5/005; H04L 5/0037; H04L 5/0053; H04L 5/0012; H04L 5/0051;
(Continued)

(56) References Cited

U.S. PATENT DOCUMENTS 9,270,437 B2 * 2/2016 Ouchi ..................... H04L 27/14
10,164,746 B2 * 12/2018 Fan ....................... H04L 5/0048
(Continued)

FOREIGN PATENT DOCUMENTS

CN  101651469 A  2/2010
CN  103535096 A  1/2014
(Continued)

OTHER PUBLICATIONS

International Search Report for PCT/CN2017/094141 dated Oct. 19, 2017 and its English translation provided by WIPO.
(Continued)

*Primary Examiner* — Hanh N Nguyen
(74) *Attorney, Agent, or Firm* — Ladas & Parry, LLP

(57) ABSTRACT

A method for transmitting uplink Sounding Reference Signal, SRS, a terminal, a network side device and a storage medium are provided. The method includes determining a transmission manner for one or more uplink SRSs in a wideband system by a terminal according to a configuration from a network side device, wherein the wideband system is configured with a plurality of basic parameters; transmitting
(Continued)

the one or more uplink SRSs to the network side device in the wideband system by the terminal according to the transmission manner.

16 Claims, 4 Drawing Sheets

(51) Int. Cl.
*H04W 28/02* (2009.01)
*H04W 72/04* (2009.01)

(52) U.S. Cl.
CPC .......... *H04L 5/0037* (2013.01); *H04L 5/0048* (2013.01); *H04L 5/0091* (2013.01); *H04W 28/0215* (2013.01); *H04W 72/0453* (2013.01); *H04L 5/0012* (2013.01)

(58) Field of Classification Search
CPC ... H04L 5/0073; H04L 5/0048; H04L 5/0039; H04L 5/0091; H04L 5/0005; H04W 28/02; H04W 72/04; H04W 28/0215; H04W 72/0453; H04B 1/713
See application file for complete search history.

(56) References Cited

U.S. PATENT DOCUMENTS

| | | | |
|---|---|---|---|
| 2010/0067410 A1 | 3/2010 | He et al. | |
| 2011/0098054 A1 | 4/2011 | Gorokhov et al. | |
| 2014/0119321 A1 | 5/2014 | Wang et al. | |
| 2014/0241242 A1 | 8/2014 | Josiam et al. | |
| 2015/0222402 A1* | 8/2015 | Ouchi | H04W 72/0446 370/329 |
| 2015/0229450 A1* | 8/2015 | Noh | H04L 5/0051 370/329 |
| 2017/0215200 A1* | 7/2017 | Mallik | H04W 72/1268 |
| 2019/0082412 A1* | 3/2019 | Zander | H04W 74/0833 |
| 2019/0182856 A1* | 6/2019 | Moroga | H04W 72/1268 |

FOREIGN PATENT DOCUMENTS

| | | |
|---|---|---|
| CN | 104426627 A | 3/2015 |
| CN | 105101257 A | 11/2015 |
| WO | 2008115123 A2 | 9/2008 |
| WO | 2011050856 A1 | 5/2011 |
| WO | 2011142640 A2 | 11/2011 |
| WO | 2013010307 A1 | 1/2013 |
| WO | 2017204285 A1 | 11/2017 |
| WO | 2017218794 A1 | 12/2017 |

OTHER PUBLICATIONS

Written Opinion of the International Searching Authority for PCT/CN2017/094141 dated Oct. 19, 2017 and its English translation provided by Google Translate.
Extended European Search Report from EP app. No. 17838551.4, dated Jul. 12, 2019.
Written Opinion of the International Searching Authority from PCT/CN2017/094141, dated Oct. 19, 2017, with English translation from WIPO.
International Preliminary Report on Patentability from PCT/CN2017/094141, dated Feb. 12, 2019, with English translation from WIPO.
First Office Action and Search Report from CN app. No. 201610663291.1, dated Jan. 21, 2020, with English translation from Global Dossier.
Notice of Reasons for Refusal from JP app. No. 2019-507277, dated Jan. 21, 2020, with English translation provided by Global Dossier.
"Multiplying of SRS and PUSCH", R1-080723, 3GPP TSG RAN WG1 #52, Sorrento, Italy, Feb. 11-15, 2008.
"NB-PUSCH design", R1-160454, 3GPP TSG RAN1 Meeting #84, St. Julian's, Malta, Feb. 15-19, 2016.
"Discussion on the multiplexing of different numerologies", R1-164985, 3GPP TSG-RAN WG1 Meeting 85, Nanjing, China, May 23-27, 2016.
Notification of Reason for Refusal from KR app. No. 10-2019-7007015, dated May 25, 2020, with English translation from Global Dossier.
"Discussion on frame structure for NR", R1-164032, 3GPP TSG RAN WG1 Meeting #85, Nanjing, China, May 23-27, 2016.
"3$^{rd}$ Generation Partnership Project; Technical Specification Group Radio Access Network; Evolved Universal Terrestrial Radio Access (E-UTRA); Physical Channels and Modulation (Release 8)", 3GPP TS 36.211 V8.8.0 (Sep. 2009).
Communication Pursuant to Article 94(3) EPC from EP app. No. 17838551.4, dated Dec. 17, 2020.

* cited by examiner

METHOD FOR TRANSMITTING UPLINK SOUNDING REFERENCE SIGNAL, TERMINAL, NETWORK SIDE DEVICE, AND STORAGE MEDIUM

CROSS-REFERENCE TO RELATED APPLICATIONS

The present application is the U.S. national phase application of a PCT Application No. PCT/CN2017/094141 filed on Jul. 24, 2017, which claims a priority to Chinese patent application No.201610663291.1 filed before China National Intellectual Property Administration on Aug. 12, 2016, the disclosures of which are incorporated by reference in their entireties.

TECHNICAL FIELD

The present disclosure relates to a field of communication technology, and in particular, relates to a method for transmitting one or more uplink Sounding Reference Signals (SRSs), a terminal, a network side device and a storage medium.

BACKGROUND

A subcarrier spacing in a mobile communication system is generally fixed to be 15 KHz, and 14 symbols are included in a subframe (except a special subframe). A last symbol in a uplink subframe may be used to transmit one or more uplink SRSs. Additionally, one or more symbols in a Uplink Pilot Time Slot (UpPTS) in the special subframe may be used to transmit the one or more uplink SRSs. A terminal may transmit the one or more uplink SRSs in one or more sub-bands. In such a situation, the one or more sub-bands in which the terminal transmits the one or more uplink SRSs at different times are different, i.e., frequencies are hopped. For example, if a system is assigned with a bandwidth of 20 MHz, and a bandwidth of the SRS is 5 MHz, then after the terminal has transmitted the one or more SRSs for four times at different sub-bands, a transmission cycle for the one or more SRSs is finished. The terminal may also transmit the one or more SRSs in an entirety of a frequency band assigned for the system, i.e. the terminal transmits the SRS periodically in the bandwidth of 20 MHz. However, current transmission of the one or more uplink SRSs by the terminal is not flexible.

SUMMARY

An objective of the present disclosure is to provide a method for transmitting one or more uplink Sounding Reference Signals (SRSs), a terminal, and a network side device, so as to address a problem that a transmission of the one or more uplink SRSs by the terminal is not flexible.

To achieve the above objective, some embodiments of the present disclosure provide a method for transmitting one or more uplink Sounding Reference Signals (SRSs). The method includes determining a transmission manner for the one or more uplink SRSs in a wideband system by a terminal according to a configuration from a network side device, wherein the wideband system is configured with a plurality of basic parameters; transmitting the one or more uplink SRSs to the network side device in the wideband system by the terminal according to the transmission manner.

Optionally, the transmitting the one or more uplink SRSs to the network side device in the wideband system by the terminal according to the transmission manner, includes: transmitting the one or more uplink SRSs to the network side device in one or more symbols in the wideband system by the terminal according to the transmission manner.

Optionally, subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having a same subcarrier spacing at different frequency-domain positions.

Optionally, the basic parameters include subcarrier spacings.

Optionally, the configuration is configured by the network side device through a dynamic signaling, a high-layer semi-persistent signaling or in an implicit manner.

Optionally, the transmission manner includes transmissions of the one or more uplink SRSs in a wideband, and the transmission manner further includes one or more of following (1) to (4): (1) whether the one or more uplink SRSs are allowed to be transmitted simultaneously in one or more frequency bands configured with the plurality of basic parameters or not; (2) the one or more uplink SRSs are only allowed to be transmitted in one or more frequency bands configured with one basic parameter; (3) the one or more uplink SRSs are transmitted in one or more frequency bands configured with the plurality of basic parameters; (4) the terminal transmits, by default, the one or more uplink SRSs are transmitted in a frequency band configured with the plurality of basic parameters, transmitted in one or more frequency bands configured with one basic parameter, or transmitted in frequency bands configured with the plurality of basic parameters simultaneously.

Optionally, the allowing the one or more uplink SRSs to be transmitted only in one or more frequency bands configured with one basic parameter, includes: allowing the one or more uplink SRSs to be transmitted in one or more frequency bands configured with a same basic parameter simultaneously or at different time points, wherein in a case that the one or more uplink SRSs are transmitted at different time points, a time relationship among transmissions of the one or more uplink SRSs in the one or more frequency bands is a default configuration for the system, or is informed by the network side device through a signaling; wherein sequences in which the one or more uplink SRSs are transmitted in the one or more frequency bands are the same or different.

Optionally, allowing the one or more uplink SRSs to be transmitted in one or more frequency bands configured with the plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among the transmissions of the one or more uplink SRSs in the one or more frequency bands is the default configuration for the system, or informed by the network side device through the signaling; wherein sequences in which the one or more uplink SRSs are transmitted in the one or more frequency bands are same or different.

Optionally, the transmission manner is a transmission of the one or more uplink SRSs in sub-bands, and a size of each of the sub-bands is configured by the network side device, and one or more frequency bands configured with one basic parameter include one or more sub-bands.

Optionally, the transmission manner includes one or more of following (1) to (3): (1) whether the one or more uplink SRSs are allowed to be transmitted by frequency-hopping among frequency bands configured with different basic parameters or not; (2) whether the one or more uplink SRSs are allowed to be transmitted by frequency-hopping among frequency bands configured with a same basic parameter or not; (3) sequences used when transmissions of the one or more uplink SRSs are frequency-hopped among frequency bands are same or different.

Some embodiments of the present disclosure further provide a method for transmitting one or more uplink Sounding Reference Signals (SRSs). The method includes: transmitting a configuration to a terminal by a network side device, so that the terminal determines a transmission manner for the one or more uplink SRSs in a wideband system according to the configuration, wherein the wideband system is configured with a plurality of basic parameters; receiving, by the network side device, the one or more uplink SRSs transmitted by the terminal in the wideband system according to the transmission manner.

Optionally, the receiving, by the network side device, the one or more uplink SRSs transmitted by the terminal in the wideband system according to the transmission manner, includes: receiving, by the network side device, the one or more uplink SRSs transmitted by the terminal in one or more symbols in the wideband system according to the transmission manner.

Optionally, subcarrier spacings in the one or more uplink SRSs at different frequency-domain positions are same; or the subcarrier spacings in the one or more uplink SRSs at different frequency-domain positions are different; or the one or more uplink SRSs are in one or more consecutive subcarriers having a same subcarrier spacing at different frequency-domain positions.

Optionally, the basic parameters include the subcarrier spacings.

Optionally, the configuration is configured by the network side device through a dynamic signaling, a high-layer semi-persistent signaling or in an implicit manner.

Optionally, the transmission manner includes transmissions of the one or more uplink SRSs in a wideband, and the transmission manner further includes one or more of following (1) to (4): (1) whether the one or more uplink SRSs are allowed to be transmitted simultaneously in one or more frequency bands configured with the plurality of basic parameters or not; (2) the one or more uplink SRSs are only allowed to be transmitted in one or more frequency bands configured with one basic parameter; (3) the one or more uplink SRSs are allowed to be transmitted in one or more frequency bands configured with the plurality of basic parameters; (4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously.

Optionally, the allowing the one or more uplink SRSs to be transmitted in one or more frequency bands configured with one basic parameter only, includes: allowing the one or more uplink SRSs to be transmitted in one or more frequency bands configured with a same basic parameter simultaneously or at different time points, wherein in a case that the one or more uplink SRSs are transmitted at different time points, a time relationship among transmissions of the one or more uplink SRSs in the one or more frequency bands is a default configuration for the system, or informed by the network side device through a signaling; wherein sequences in which the one or more uplink SRSs are transmitted in the one or more frequency bands are the same or different.

Optionally, the allowing the one or more uplink SRSs to be transmitted in one or more frequency bands configured with the plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among transmissions of the one or more uplink SRSs in the one or more frequency bands is the default configuration for the system, or informed by the network side device through a signaling; wherein sequences in which the one or more uplink SRSs are transmitted in the one or more frequency bands are the same or different.

Optionally, the transmission manner is a transmission of the one or more uplink SRSs in sub-bands, and a size of each of the sub-bands is configured by the network side device, and one or more frequency bands configured with one basic parameter include one or more sub-bands.

Optionally, the transmission manner includes one or more of following (1) to (3): (1) whether the one or more uplink SRSs are allowed to be transmitted by frequency-hopping among the frequency bands configured with different basic parameters or not; (2) whether the one or more uplink SRSs are allowed to be transmitted by frequency-hopping among the frequency bands configured with a same basic parameter or not; (3) sequences used when transmissions of the one or more uplink SRSs are frequency-hopped among frequency bands are same or different.

Some embodiments of the present disclosure further provide a terminal. The terminal includes a determination module, configured to determine a transmission manner for one or more uplink Sounding Reference signals (SRSs) in a wideband system according to a configuration from a network side device, wherein the wideband system is configured with a plurality of basic parameters; a transmission module, configured to transmit the one or more uplink SRSs to the network side device in the wideband system according to the transmission manner.

Optionally, the transmission module transmits the one or more uplink SRSs to the network side device in one or more symbols in the wideband system according to the transmission manner.

Optionally, subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having a same subcarrier spacing at different frequency-domain positions.

Optionally, the basic parameters include subcarrier spacings.

Optionally, the configuration is configured by the network side device through a dynamic signaling, a high-layer semi-persistent signaling or in an implicit manner.

Optionally, the transmission manner includes a transmission of the one or more uplink SRSs in a wideband, and the transmission manner further includes one or more of following (1) to (4): (1) whether the one or more uplink SRSs are allowed to be transmitted simultaneously in one or more frequency bands configured with the plurality of basic parameters or not; (2) the one or more uplink SRSs are only allowed to be transmitted in one or more frequency bands configured with one basic parameter; (3) the one or more uplink SRSs are allowed to be transmitted in one or more frequency bands configured with the plurality of basic parameters; (4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously.

Optionally, the allowing the one or more uplink SRSs to be transmitted only in one or more frequency bands configured with one basic parameter, includes: allowing the one or more uplink SRSs to be transmitted in one or more frequency bands configured with a same basic parameter simultaneously or at different time points, wherein in a case that the one or more uplink SRSs are transmitted at different time points, a time relationship among transmissions of the one or more uplink SRSs in the one or more frequency bands is a default configuration for the system, or is informed by the network side device through a signaling; wherein sequences in which the one or more uplink SRSs are transmitted in the one or more frequency bands are the same or different.

Optionally, allowing the one or more uplink SRSs to be transmitted in one or more frequency bands configured with the plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among the transmissions of the one or more uplink SRSs in the one or more frequency bands is a default configuration for the system, or informed by the network side device through the signaling; wherein sequences in which the one or more uplink SRSs are transmitted in the one or more frequency bands are same or different.

Optionally, the transmission manner is a transmission of the one or more uplink SRSs in sub-bands, and a size of each of the sub-bands is configured by the network side device, and one or more frequency bands configured with one basic parameter include one or more sub-bands.

Optionally, the transmission manner includes one or more of following (1) to (3): (1) whether the one or more uplink SRSs are allowed to be transmitted by frequency-hopping among the frequency bands configured with different basic parameters or not; (2) whether the one or more uplink SRSs are allowed to be transmitted by frequency-hopping among the frequency bands configured with a same basic parameter or not; (3) sequences used when transmissions of the one or more uplink SRSs are frequency-hopped among frequency bands are same or different.

Some embodiments of the present disclosure further provide a network side device. The network side device includes a transmission module, configured to transmit a configuration to a terminal, so that the terminal determines a transmission manner for the one or more uplink SRSs in a wideband system according to the configuration, wherein the wideband system is configured with a plurality of basic parameters; a reception module, configured to receive the one or more uplink SRSs transmitted by the terminal in the wideband system according to the transmission manner.

Optionally, the reception module is configured to receive the one or more uplink SRSs transmitted by the terminal in one or more symbols in the wideband system according to the transmission manner.

Optionally, subcarrier spacings in the one or more uplink SRSs at different frequency-domain positions are same; or the subcarrier spacings in the one or more uplink SRSs at different frequency-domain positions are different; or the one or more uplink SRSs are in one or more consecutive subcarriers having a same subcarrier spacing at different frequency-domain positions.

Optionally, the basic parameters include the subcarrier spacings.

Optionally, the configuration is configured by the network side device through a dynamic signaling, a high-layer semi-persistent signaling or in an implicit manner.

Optionally, wherein, the transmission manner includes transmissions of the one or more uplink SRSs in a wideband, and the transmission manner further includes one or more of following (1) to (4): (1) whether the one or more uplink SRSs are allowed to be transmitted simultaneously in one or more frequency bands configured with the plurality of basic parameters or not; (2) the one or more uplink SRSs are only allowed to be transmitted in one or more frequency bands configured with one basic parameter, (3) the one or more uplink SRSs are allowed to be transmitted in frequency bands configured with the plurality of basic parameters; (4) the terminal transmits, by default, the one or more uplink SRSs are transmitted in a frequency band configured with the plurality of basic parameters, transmitted in one or more frequency bands configured with one basic parameter, or transmitted in frequency bands configured with the plurality of basic parameters simultaneously.

Optionally, the allowing the one or more uplink SRSs to be transmitted in one or more frequency bands configured with one basic parameter, includes: allowing the one or more uplink SRSs to be transmitted in one or more frequency bands configured with a same basic parameter simultaneously or at different time points, wherein in a case that the one or more uplink SRSs are transmitted at different time points, a time relationship among transmissions of the one or more uplink SRSs in the one or more frequency bands is a default configuration for the system, or informed by the network side device through a signaling; wherein sequences in which the one or more uplink SRSs are transmitted in the one or more frequency bands are same or different.

Optionally, the allowing the one or more uplink SRSs to be transmitted in one or more frequency bands configured with a plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among transmissions of the one or more uplink SRSs in the one or more frequency bands is the default configuration for the system, or informed by the network side device through a signaling; wherein sequences in which the one or more uplink SRSs are transmitted in the one or more frequency bands are the same or different.

Optionally, the transmission manner is a transmission of the one or more uplink SRSs in sub-bands, and a size of each of the sub-bands is configured by the network side device, and one or more frequency bands configured with one basic parameter include one or more sub-bands.

Optionally, the transmission manner includes one or more of following (1) to (3): (1) whether the one or more uplink SRSs are allowed to be transmitted by frequency-hopping among frequency bands configured with different basic parameters or not; (2) whether the one or more uplink SRSs are allowed to be transmitted by frequency-hopping among frequency bands configured with a same basic parameter or not; (3) sequences used when transmissions of the one or more uplink SRSs are frequency-hopped among frequency bands are same or different.

Some embodiments of the present disclosure further provide a terminal. The terminal includes a processor, and a transceiver, configured to receive and transmit data under a control of the processor, wherein the processor is configured to perform following steps: determining a transmission manner for one or more uplink Sounding Reference Signals (SRSs) in a wideband system according to a configuration from a network side device, wherein the wideband system is configured with a plurality of basic parameters; and transmitting the one or more uplink SRSs to the network side device in the wideband system according to the transmission manner.

Some embodiments of the present disclosure further provide a network side device. The network side device includes a processor, and a transceiver, configured to receive and transmit data under a control of the processor; wherein the processor is configured to perform following steps: transmitting a configuration to a terminal, so that the terminal determines a transmission manner for one or more uplink Sounding Reference Signals (SRSs) in a wideband system according to the configuration, wherein the wideband system is configured with a plurality of basic parameters; receiving the one or more uplink SRSs transmitted by the terminal in the wideband system according to the transmission manner.

Some embodiments of the present disclosure further provide a non-volatile computer readable storage medium. The medium includes computer readable instructions, stored on the non-volatile computer readable storage medium and executable by a processor, wherein in a case that the computer readable instructions are executed by a processor, the processor performs following steps: determining a transmission manner for one or more uplink Sounding Reference Signals (SRSs) in a wideband system according to a configuration from a network side device, wherein the wideband system is configured with a plurality of basic parameters; and transmitting the one or more uplink SRSs to the network side device in the wideband system according to the transmission manner.

Some embodiments of the present disclosure further provide a non-volatile computer readable storage medium. The medium includes computer readable instructions, stored on the non-volatile computer readable storage medium and executable by a processor, wherein in a case that the computer readable instructions are executed by a processor, the processor performs following steps: transmitting a configuration to a terminal, so that the terminal determines a transmission manner for one or more uplink Sounding Reference Signals (SRSs) in a wideband system according to the configuration, wherein the wideband system is configured with a plurality of basic parameters; receiving the one or more uplink SRSs transmitted by the terminal in the wideband system according to the transmission manner.

The technical solutions of the present disclosure at least have following advantages. In the embodiments of the present disclosure, the terminal determines a transmission manner for one or more uplink SRSs in a wideband system according to a configuration from a network side device, wherein the wideband system is configured with a plurality of basic parameters; and the terminal transmits the one or more uplink SRSs to the network side device in the wideband system according to the transmission manner. In this way, the one or more uplink SRSs may be transmitted flexibly in the wideband system configured with a plurality basic parameters according the configuration from the network side device.

DETAILED DESCRIPTION

To make technical problems to be solved, technical solutions, and advantages of the present disclosure clearer, specific embodiments will be described hereinafter in detail in combination with the drawings.

Figure 1:
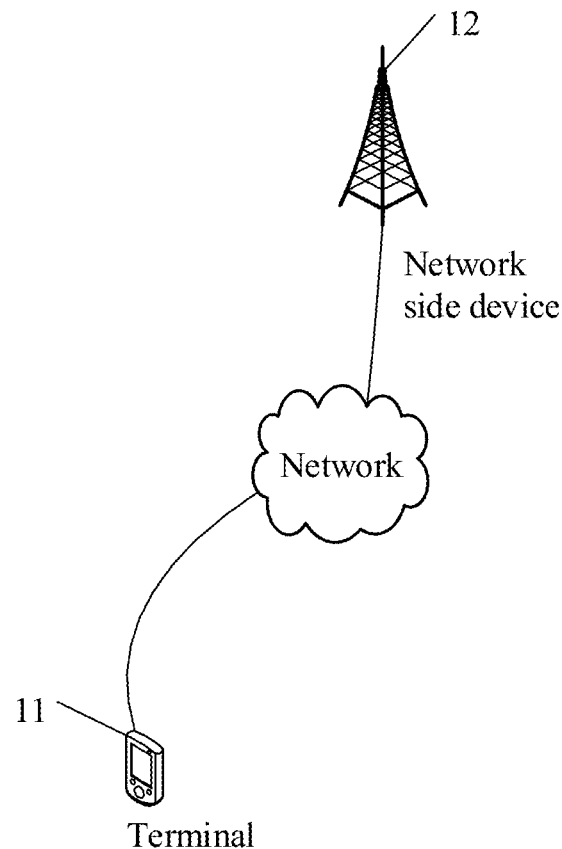
FIG. 1 is a structural schematic diagram of a network in which some embodiments of the present disclosure are applied.

Referring to FIG. 1, FIG. 1 is a structural schematic diagram of a network in which some embodiments of the present disclosure are applicable to. As shown in FIG. 1, the network includes one or more terminals 11 and one or more network side devices 12. The terminal 11 may be a User Equipment (UE), such as a cellular phone, a Tablet Personal Computer, a Laptop Computer, a Personal Digital Assistant (PDA), a Mobile Internet Device (MID), a Wearable Device, or a terminal side device. It should be noted that the terminal 11 in some embodiments of the present disclosure is not specifically limited to a specific type of terminal. The terminal 11 may establish a communication with the network side device 12. The network in FIG. 1 may represent that the terminal 11 and the network side device 12 establish a wireless communication. The network side device 12 may be a base station. The base station may be a macro base station, such as a Long Term Evolution (LTE) eNB, a 5G NR NB, or the like; or the base station may be a micro base station, such as a low power node (LPN), a pico base station, or a femto base station; or the base station may be an access point (AP). The network side device 12 may also be network nodes formed by a central unit (CU) and a plurality of Transmission Reception Point (TRP) managed and controlled by the central unit. Additionally, the base station may manage one or more cells (such as cells having different frequency bins or split sectors). It is noted that the network side device in some embodiments of the present disclosure is not limited to a specific type of network side device.

Figure 2:
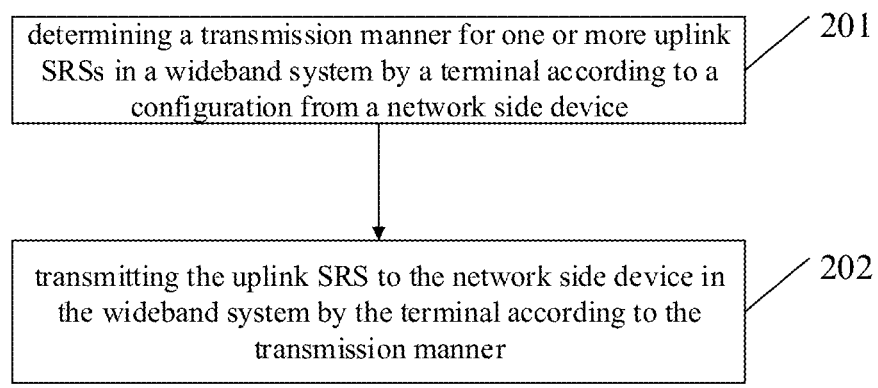
FIG. 2 is a flowchart of a method for transmitting one or more uplink SRSs provided in some embodiments of the present disclosure.

Referring to FIG. 2, some embodiments of the present disclosure provide a method for transmitting one or more uplink Sounding Reference signals (SRSs), as shown in FIG. 2. The method includes steps 201-202.

Step 201: determining a transmission manner for one or more uplink SRSs in a wideband system by a terminal according to a configuration from a network side device, wherein the wideband system is configured with a plurality of basic parameters.

Step 202: transmitting the one or more uplink SRSs to the network side device in the wideband system by the terminal according to the transmission manner.

The plurality of basic parameters configured to the wideband system may be understood as a case that the basic parameters in some frequency bands in the wideband system are different. Additionally, the above basic parameters may be basic signal parameters in the wideband system, such as subcarrier spacings. For example, a part of a wideband system is formed of signals having a subcarrier spacing of N Hz, and another part of the wideband system is formed of signals having a subcarrier spacing of M Hz, and lengths of symbols are different because the subcarrier spacings are different.

Additionally, the transmission manner for the one or more uplink SRSs in the wideband system may be determined by the terminal according to the configuration because the configuration indicates all transmission manners for the one or more uplink SRSs, and thus the terminal may determine the transmission manner for the one or more uplink SRSs directly according to the configuration. Optionally, the transmission manner for the one or more uplink SRSs in the wideband system may be determined by the terminal according to the configuration because the configuration indicates a part of the transmission manner for the one or more uplink SRSs, and the terminal may determine the transmission manner for the one or more uplink SRSs according to the configuration and parameters of the terminal. For example, the configuration indicates that the one or more uplink SRSs may be transmitted in the wideband, and the terminal may transmit, by default, the one or more uplink SRSs are transmitted in one or more frequency bands configured with one or more of the basic parameters simultaneously.

After the transmission manner for the one or more uplink SRSs is determined, the terminal may transmit the one or more uplink SRSs in the wideband system according to the transmission manner. The one or more uplink SRSs may be transmitted periodically. Through the above steps, the one or more uplink SRSs may be transmitted flexibly according to the configuration from the network side device in the wideband system configured with the plurality of basic parameters. The configuration from the network side device may also be understood to be a case that the terminal transmits the one or more uplink SRSs flexibly under a control of the network side device.

Optionally, the transmitting the one or more uplink SRSs to the network side device in the wideband system by the terminal according to the transmission manner, includes: transmitting the one or more uplink SRSs to the network side device in one or more symbols in the wideband system by the terminal according to the transmission manner.

In the embodiments, the one or more uplink SRSs may be transmitted in the one or more symbols in uplink resources by the terminal. The one or more symbols in which the one or more uplink SRSs are transmitted may be configured by the network side device, or pre-negotiated between the terminal and the network side device, which is not specifically limited in the embodiments of the present disclosure.

Optionally, subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having the same subcarrier spacing at different frequency-domain positions.

Figure 3:
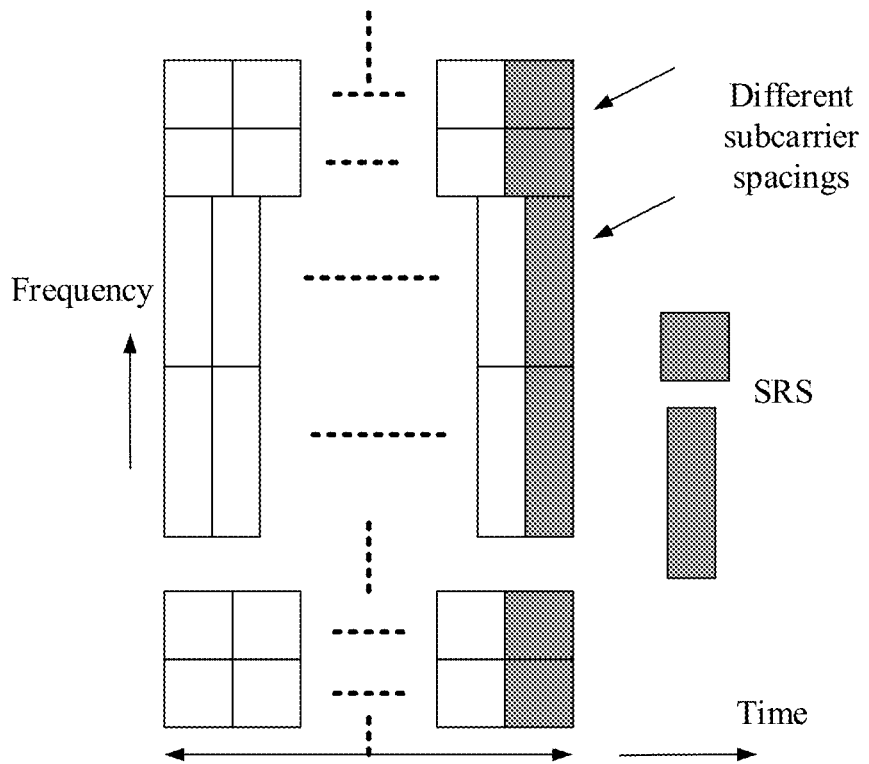
FIG. 3 is a schematic diagram of subcarrier spacings in a wideband system provided in some embodiments of the present disclosure.

The same subcarrier spacing of the one or more uplink SRSs at different frequency-domain positions may mean that subcarrier spacings of the one or more uplink SRSs at some frequency-domain positions are the same, and subcarrier spacings of the one or more uplink SRSs at all frequency-domain positions are not necessarily the same, i.e., the subcarrier spacings of the one or more uplink SRSs at a part of the all frequency-domain positions are the same. The different subcarrier spacings of the one or more uplink SRSs at different frequency-domain positions may mean that subcarrier spacings of the one or more uplink SRSs at different frequency-domain positions in some frequency bands are different, and subcarrier spacings of the one or more uplink SRSs at all frequency-domain positions are not necessarily different. For example, as shown in FIG. 3, the subcarrier spacings of the one or more uplink SRSs at some frequency-domain positions are the same, and the subcarrier spacings of the one or more uplink SRSs at other frequency-domain positions are different. In the embodiments, when the one or more uplink SRSs are transmitted, the subcarrier spacings of the one or more uplink SRSs at different frequency bands may be configured to be the same or different and the one or more uplink SRSs may be in the one or more consecutive subcarriers having the same subcarrier spacing, specifically referring to FIG. 3.

Optionally, the above basic parameters include the subcarrier spacings.

In the embodiments, the above wideband system may be configured as a wideband system configured with a plurality of subcarrier spacings, as shown in FIG. 3, for example. In the embodiments of the present disclosure, the above basic parameters are not limited to the subcarrier spacings only, and may include other basic parameters, such as duration of timeslots, or the like, which is not specifically limited in some embodiments of the present disclosure.

Optionally, the configuration from the network side device may be configured by the network side device through a dynamic signaling, a high-layer semi-persistent signaling or in an implicit manner.

In the embodiments, the configuration may be obtained through the dynamic signaling, the high-layer semi-persistent signaling or in the implicit manner. The implicit manner may be understood as the configuration being obtained through an implicit signaling. For example, the network side device configures a bandwidth of the SRS to correspond to one basic parameter (such as the subcarrier spacing) only, or the network side device configures the bandwidth of the SRS to correspond to the plurality of basic parameters, and accordingly, the network side device may configure whether the terminal is allowed to transmit the one or more uplink SRSs simultaneously in the one or more frequency bands configured with the plurality of basic parameters (such as the subcarrier spacings) simultaneously or not. As other embodiments, the network side device may restrict the terminal to transmit the one or more uplink SRSs in certain frequency bands by configuring a width of a sub-band and a frequency-hopping range, so as to configure whether the terminal is allowed to transmit the one or more uplink SRSs in a frequency-hopping manner among a plurality of frequency bands having different basic parameters or not.

Optionally, the transmission manner may include transmission of the one or more uplink SRSs in a wideband, and the transmission manner may also include one or more of following (1) to (4).

(1) whether the one or more uplink SRSs are allowed to be transmitted simultaneously in one or more frequency bands configured with the plurality of basic parameters or not.

(2) the one or more uplink SRSs are only allowed to be transmitted in one or more frequency bands configured with one basic parameter.

(3) the one or more uplink SRSs are allowed to be transmitted in one or more frequency bands configured with the plurality of basic parameters.

(4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously.

The one or more frequency bands configured the plurality of basic parameters may be understood as a case that the one or more frequency bands are configured with the plurality of basic parameters, such as the one or more frequency bands are configured with a plurality of subcarrier spacings. The above one or more frequency bands configured with one basic parameter may be understood as a case that the one or more frequency bands are configured with one basic parameter, or the one or more frequency bands are configured with one type of basic parameters and the basic parameters in the one type are same. Allowing the terminal to transmit the one or more uplink SRSs in one or more frequency bands configured with one type of basic parameters may mean that the one or more uplink SRSs are only allowed to be transmitted in one or more frequency bands configured with the one type of basic parameters and the basic parameters are specific basic parameters, and the specific basic parameters are configured by the network side device. Optionally, allowing the one or more uplink SRSs to be transmitted in one or more frequency bands configured with the one type of basic parameters may mean that the one or more uplink SRSs are only allowed to be transmitted in one or more frequency bands configured with the one type of basic parameters.

The one or more frequency bands configured with the plurality of basic parameters may be understood as the one or more frequency bands configured with different basic parameters, and the allowing the one or more uplink SRSs to be transmitted in the one or more frequency bands configured with different basic parameters may mean that the one or more uplink SRSs are allowed to be transmitted in the one or more frequency bands configured with different basic parameters.

In some embodiments of the present disclosure, the network side device may configure that the one or more uplink SRSs are transmitted in the wideband, that whether the one or more uplink SRSs are allowed to be transmitted simultaneously in the one or more frequency bands configured with the plurality of basic parameters or not, and that the one or more uplink SRSs are only allowed to be transmitted in frequency bands configured with one type of basic parameters, and that the one or more uplink SRSs are allowed to be transmitted in frequency bands configured with the plurality of basic parameters. For example, the network side device may configure these through a dynamic signaling, a high-layer semi-persistent signaling, or in an implicit manner. In some scenes, the terminal may also determine autonomously that the one or more uplink SRSs are transmitted only in one or more frequency bands configured with one basic parameter or is transmitted in one or more frequency bands configured with the plurality of basic parameters. This determination by the terminal in the present disclosure is not limited.

Additionally, the terminal transmitting, by default, the one or more uplink SRSs in a frequency band configured with the plurality of basic parameters, in one or more frequency bands configured with one basic parameter, or simultaneously in frequency bands configured with the plurality of basic parameters, may be that the terminal transmits, by default, the one or more uplink SRSs simultaneously in frequency bands configured with the plurality of basic parameters, or that the terminal transmits, by default, the one or more uplink SRSs simultaneously in one or more frequency bands configured with one basic parameter, or that the terminal transmits, by default, the one or more uplink SRSs simultaneously in frequency bands configured with a plurality of basic parameters. The default in the present disclosure may be preconfigured for the terminal without being configured by the network side device.

Optionally, in some embodiments of the present disclosure, allowing the one or more uplink SRSs to be transmitted only in one or more frequency bands configured with one basic parameter, includes: allowing the one or more uplink SRSs to be transmitted in one or more frequency bands configured with the same basic parameter simultaneously or at different time points, wherein in a case that the one or more uplink SRSs are transmitted at different time points, a time relationship among transmissions of the one or more uplink SRSs in the one or more frequency bands is a default configuration for the system, or is informed by the network side device through a signaling; wherein sequences in which the one or more uplink SRSs are transmitted in the one or more frequency bands are the same or different.

The allowing the one or more uplink SRSs to be transmitted in one or more frequency bands configured with the same basic parameter simultaneously or at different time points may include allowing the one or more uplink SRSs to be transmitted in one or more frequency bands configured with a specific basis parameter simultaneously or at different time points. For example, basic parameters (for example, the subcarrier spacings) in two frequency bands in the system are the same, and the terminal may be configured to transmit the one or more uplink SRSs in the two frequency bands simultaneously or at two different time points when transmitting SRS in a wideband. The time relationship among the transmissions of the one or more uplink SRSs for multiple times under a condition that the one or more uplink SRSs are transmitted at different time points may be the default configuration for the system or may be informed by the network side device through the signaling.

Optionally, allowing the one or more uplink SRSs to be transmitted in one or more frequency bands configured with the plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among the transmissions of the one or more uplink SRSs in the one or more frequency bands is the default configuration for the system, or informed by the network side device through the signaling; wherein sequences in which the one or more uplink SRSs are transmitted in the one or more frequency bands are same or different.

The allowing the one or more uplink SRSs to be transmitted in one or more frequency bands configured with different basic parameters simultaneously or at different time points may include allowing the one or more uplink SRSs to be transmitted in a wideband simultaneously or at different time points. For example, basic parameters (for example, the subcarrier spacings) in two frequency bands in the system are different, and the terminal may be configured to transmit the one or more uplink SRSs in the two frequency bands simultaneously or at two different time points when transmitting SRS in the wideband. The time relationship among the transmissions of the one or more uplink SRSs for multiple times under a condition that the one or more uplink SRSs are transmitted at different time points may be the default configuration for the system or be informed by the network side device through the signaling.

Optionally, the above transmission manner is a transmission of the one or more uplink SRSs in sub-bands, and a size of each of the sub-bands is configured by the network side device, and one or more frequency bands configured with one basic parameter include one or more sub-bands.

In the embodiments, the one or more uplink SRSs may be transmitted in the sub-bands according to a configuration from the network side device, and the size of each sub-band is configured by the network side device. Additionally, the above case that the one or more frequency bands configured with one basic parameter include one or more subbands may be understood as a case that one or more frequency bands configured with any basic parameter may include one or more sub-bands, and frequency bands configured with different basic parameters may include a same sub-band quantity or different sub-band quantities.

Additionally, in the embodiments, the one or more uplink SRSs may be transmitted periodically, and every time the one or more uplink SRSs are transmitted, the transmission of the SRS may be frequency-hopped, i.e., sub-bands used by one transmission of the one or more uplink SRSs may be different for sub-bands used by another transmission of the one or more uplink SRSs.

Optionally, the transmission manner may include one or more of following (1) to (3).

(1) whether the one or more uplink SRSs are allowed to be transmitted by frequency-hopping among the frequency bands configured with different basic parameters or not.

(2) whether the one or more uplink SRSs are allowed to be transmitted by frequency-hopping among the frequency bands configured with the same basic parameter or not.

(3) sequences used when transmissions of the one or more uplink SRSs are frequency-hopped among frequency bands are same or different.

In the embodiments, whether the one or more uplink SRSs are allowed to be transmitted by frequency-hopping among the frequency bands configured with different basic parameters or not may be configured by the network side device. For example, the network side device may inform, through the dynamic signaling or the high-layer semi-persistent signaling, the terminal about whether frequency-hopping among frequency bands configured with the plurality of basic parameters (such as subcarrier spacings) is allowed or not; and the network side device may inform, in the implicit manner, the terminal about whether the frequency-hopping among frequency bands configured with the plurality of basic parameters (such as the subcarrier spacings) is allowed or not. For example, the network side device may limit the terminal to transmit the one or more uplink SRSs in certain frequency bands by configuring sizes of the sub-bands and a frequency-hopping range. Whether the one or more uplink SRSs may be transmitted by the frequency-hopping among the frequency bands configured with the same basic parameter or not may also be configured through the dynamic signaling, or the high-layer semi-persistent signaling or through the implicit manner.

It should be noted that, the optional embodiments described above may be implemented by combining the embodiments or may be implemented independently, which are not limited in the present disclosure. Additionally, the above configuration by the network side device may be performed flexibly according to actual conditions of the terminal or actual conditions in a wideband system.

In some embodiments of the present disclosure, the terminal determines the transmission manner for the one or more uplink SRSs in the wideband system according to the configuration from a network side device, wherein the wideband system is configured with a plurality of basic parameters; and the terminal transmits the one or more uplink SRSs to the network side device in the wideband system according to the transmission manner. In this way, the one or more uplink SRSs may be transmitted flexibly according to the configuration from the network side device in the wideband system configured with the plurality of basic parameters.

Figure 4:
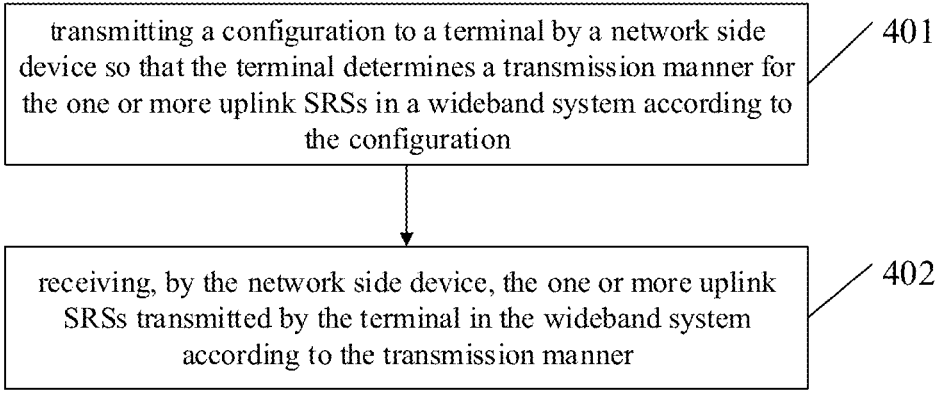
FIG. 4 is another flowchart of the method for transmitting the one or more uplink SRSs provided in some embodiments of the present disclosure.

Referring to FIG. 4, some embodiments of the present disclosure provide a method for transmitting one or more uplink Sounding Reference signal (SRSs), as shown in FIG. 4. The method includes steps 401-402.

Step 401: transmitting a configuration to a terminal by a network side device so that the terminal determines a transmission manner for the one or more uplink SRSs in a wideband system according to the configuration from the network side device, wherein the wideband system is configured with a plurality of basic parameters.

Step 402: receiving, by the network side device, the one or more uplink SRSs transmitted by the terminal in the wideband system according to the transmission manner.

It should be noted that, the above configuration may be configured to the terminal through one or more steps or one or more signaling.

Optionally, the receiving, by the network side device, the one or more uplink SRSs transmitted by the terminal in the wideband system according to the transmission manner, includes: receiving, by the network side device, the one or more uplink SRSs transmitted by the terminal in one or more symbols in the wideband system according to the transmission manner.

Optionally, subcarrier spacings in the one or more uplink SRSs at different frequency-domain positions are the same; or the subcarrier spacings in the one or more uplink SRSs at different frequency-domain positions are different; or the one or more uplink SRSs are in one or more consecutive subcarriers having the same subcarrier spacing at different frequency-domain positions.

Optionally, the above basic parameters include the subcarrier spacings.

Optionally, the configuration from the network side device may be configured by the network side device through a dynamic signaling, a high-layer semi-persistent signaling or in an implicit manner.

Optionally, the transmission manner may include transmission of the one or more uplink SRSs in a wideband, and the transmission manner may also include one or more of following (1)-(4).

(1) whether the one or more uplink SRSs are allowed to be transmitted simultaneously in one or more frequency bands configured with the plurality of basic parameters or not.

(2) the one or more uplink SRSs are only allowed to be transmitted in one or more frequency bands configured with one basic parameter.

(3) the one or more uplink SRSs are allowed to be transmitted in one or more frequency bands configured with the plurality of basic parameters.

(4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously.

Optionally, allowing the one or more uplink SRSs to be transmitted in one or more frequency bands configured with one basic parameter only, includes: allowing the one or more uplink SRSs to be transmitted in one or more frequency bands configured with the same basic parameter simultaneously or at different time points, wherein in a case that the one or more uplink SRSs are transmitted at different time points, a time relationship among transmissions of the one or more uplink SRSs in the one or more frequency bands is a default configuration for the system, or informed by the network side device through a signaling; wherein sequences in which the one or more uplink SRSs are transmitted in the one or more frequency bands are same or different.

Optionally, allowing the one or more uplink SRSs to be transmitted in one or more frequency bands configured with the plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among transmissions of the one or more uplink SRSs in the one or more frequency bands is the default configuration for the system, or informed by the network side device through a signaling; wherein sequences in which the one or more uplink SRSs are transmitted in the one or more frequency bands are the same or different.

Optionally, the above transmission manner is a transmission of the one or more uplink SRSs in sub-bands, and a size of each of the sub-bands is configured by the network side device, and one or more frequency bands configured with one basic parameter include one or more sub-bands.

Optionally, the transmission manner may include one or more of following (1) to (3).

(1) whether the one or more uplink SRSs may be transmitted by frequency-hopping among frequency bands configured with different basic parameters or not.

(2) whether the one or more uplink SRSs may be transmitted by frequency-hopping among the frequency bands configured with the same basic parameter or not.

(3) sequences used when transmissions of the one or more uplink SRSs are frequency-hopped among frequency bands are same or different.

It is noted that the network side device in the embodiments of the present disclosure may be the network side device shown in FIG. 2 in some embodiments of the present disclosure. A detailed implementation of the network side device may be obtained by referring to the embodiments shown in FIG. 2 which is not repeated so as to avoid repeated descriptions thereof. In some embodiments of the present disclosure, an overhead of a system message may be also reduced.

Figure 5:
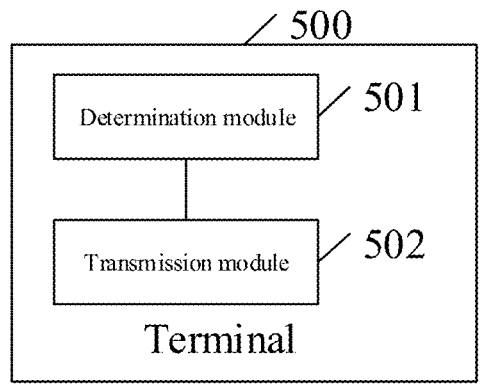
FIG. 5 is a structural schematic diagram of a terminal provided in some embodiments of the present disclosure.

Referring to FIG. 5, FIG. 5 shows a structure of a terminal. As shown in FIG. 5, the terminal 500 includes a determination module 501 and a transmission module 502.

The determination module 501 is configured to determine a transmission manner for one or more uplink SRSs in a wideband system according to a configuration from a network side device, wherein the wideband system is configured with a plurality of basic parameters.

The transmission module 502 is configured to transmit the one or more uplink SRSs to the network side device in the wideband system by the terminal according to the transmission manner.

Optionally, the transmission module 502 transmits the one or more uplink SRSs to the network side device in one or more symbols in the wideband system according to the transmission manner.

Optionally, subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having the same subcarrier spacing at different frequency-domain positions.

Optionally, the above basic parameters include the subcarrier spacings.

Optionally, the configuration from the network side device may be configured by the network side device through a dynamic signaling, a high-layer semi-persistent signaling or in an implicit manner.

Optionally, the transmission manner may include transmission of the one or more uplink SRSs in a wideband, and the transmission manner may also include one or more of following (1) to (4).

(1) whether the one or more uplink SRSs are allowed to be transmitted simultaneously in one or more frequency bands configured with the plurality of basic parameters or not.

(2) the one or more uplink SRSs are only allowed to be transmitted in one or more frequency bands configured with one basic parameter.

(3) the one or more uplink SRSs are allowed to be transmitted in frequency bands configured with the plurality of basic parameters.

(4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously.

Optionally, allowing the one or more uplink SRSs to be transmitted only in one or more frequency bands configured with one basic parameter, includes: allowing the one or more uplink SRSs to be transmitted in one or more frequency bands configured with the same basic parameter simultaneously or at different time points, wherein in a case that the one or more uplink SRSs are transmitted at different time points, a time relationship among transmissions of the one or more uplink SRSs in the one or more frequency bands is a default configuration for the system, or is informed by the network side device through a signaling; wherein sequences in which the one or more uplink SRSs are transmitted in the one or more frequency bands are same or different.

Optionally, allowing the one or more uplink SRSs to be transmitted in one or more frequency bands configured with the plurality of basic parameters, includes: allowing the one or more uplink SRSs to be transmitted in one or more frequency bands configured with different basic parameters simultaneously or at different time points, wherein in a case that the one or more uplink SRSs re transmitted at different time points, the time relationship among the transmissions of the one or more uplink SRSs in the one or more frequency bands is the default configuration for the system, or informed by the network side device through the signaling; wherein sequences in which the one or more uplink SRSs are transmitted in the one or more frequency bands are same or different.

Optionally, the above transmission manner is transmission of the one or more uplink SRSs in sub-bands, and a size of each of the sub-bands is configured by the network side device, and one or more frequency bands configured with one basic parameter include one or more sub-bands.

Optionally, the transmission manner may include one or more of following (1) to (3).

(1) whether the one or more uplink SRSs are allowed to be transmitted by frequency-hopping among the frequency bands configured with different basic parameters or not.

(2) whether the one or more uplink SRSs are allowed to be transmitted by frequency-hopping among the frequency bands configured with the same basic parameter or not.

(3) sequences used when transmissions of the one or more uplink SRSs are frequency-hopped among frequency bands are same or different.

It should be noted that, the terminal 500 in some embodiments of the present disclosure may be the terminal in the process embodiments of the present disclosure, and the terminal in the embodiments of the present disclosure may be implemented by the terminal 500 of the present disclosure, and same technical effects may be achieved and repeated description is not provided herein.

Figure 6:
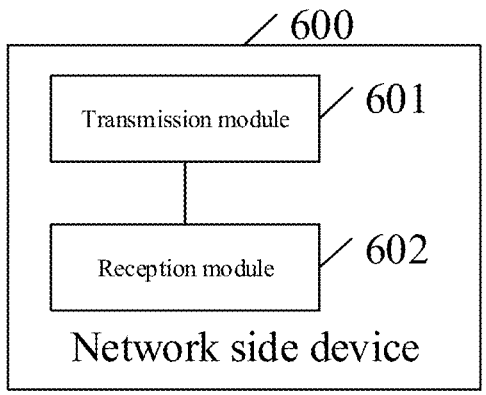
FIG. 6 is a structural schematic diagram of a network side device provided in some embodiments of the present disclosure.

Referring to FIG. 6, FIG. 6 shows a structure of a network side device. The network side device 600 includes a transmission module 601 and a reception module 602.

The transmission module 601 is configured to transmit a configuration to a terminal so that the terminal determines a transmission manner for one or more uplink SRSs in a wideband system according to the configuration from a network side device, wherein the wideband system is configured with a plurality of basic parameters.

The reception module 602 is configured to receive the one or more uplink SRSs transmitted by the terminal in the wideband system according to the transmission manner.

Optionally, the reception module 602 is configured to receive the one or more uplink SRSs transmitted by the terminal in one or more symbols in the wideband system according to the transmission manner.

Optionally, subcarrier spacings in the one or more uplink SRSs at different frequency-domain positions are the same; or the subcarrier spacings in the one or more uplink SRSs at different frequency-domain positions are different; or the one or more uplink SRSs are in one or more consecutive subcarriers having the same subcarrier spacing at different frequency-domain positions.

Optionally, the above basic parameters include the subcarrier spacings.

Optionally, the configuration from the network side device may be configured by the network side device through a dynamic signaling, a high-layer semi-persistent signaling or an implicit manner.

Optionally, the transmission manner may include transmission of the one or more uplink SRSs in a wideband, and the transmission manner may also include one or more of following (1)-(4).

(1) whether the one or more uplink SRSs are allowed to be transmitted simultaneously in one or more frequency bands configured with the plurality of basic parameters or not.

(2) the one or more uplink SRSs are only allowed to be transmitted in one or more frequency bands configured with one basic parameter.

(3) the one or more uplink SRSs are allowed to be transmitted in one or more frequency bands configured with the plurality of basic parameters.

(4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously.

Optionally, allowing the one or more uplink SRSs to be transmitted in one or more frequency bands configured with one basic parameter, includes: allowing the one or more uplink SRSs to be transmitted in one or more frequency bands configured with same basic parameter simultaneously or at different time points, wherein in a case that the one or more uplink SRSs are transmitted at different time points, a time relationship among transmissions of the one or more uplink SRSs in the one or more frequency bands is a default configuration for the system, or informed by the network side device through a signaling; wherein sequences in which the one or more uplink SRSs are transmitted in the one or more frequency bands are the same or different.

Optionally, allowing the one or more uplink SRSs to be transmitted in one or more frequency bands configured with a plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among transmissions of the one or more uplink SRSs in the one or more frequency bands is the default configuration for the system, or informed by the network side device through a signaling; wherein sequences in which the one or more uplink SRSs are transmitted in the one or more frequency bands are the same or different.

Optionally, the above transmission manner is transmission of the one or more uplink SRSs in sub-bands, and a size of each of the sub-bands is configured by the network side device, and one or more frequency bands configured with one basic parameter include one or more sub-bands.

Optionally, the transmission manner may include one or more of following (1) to (3).

(1) whether the one or more uplink SRSs are allowed to be transmitted by frequency-hopping among the frequency bands configured with different basic parameters or not.

(2) whether the one or more uplink SRSs are allowed to be transmitted by frequency-hopping among the frequency bands configured with the same basic parameter or not.

(3) sequences used when transmissions of the one or more uplink SRSs are frequency-hopped among frequency bands are same or different.

It should be noted that, the network side device 600 in some embodiments of the present disclosure may be the network side device in the process embodiments of the present disclosure, and the network side device in the embodiments of the present disclosure may be implemented by the network side device 600 of the present disclosure, and same technical effects may be achieved and repeated description is not provided herein.

Figure 7:
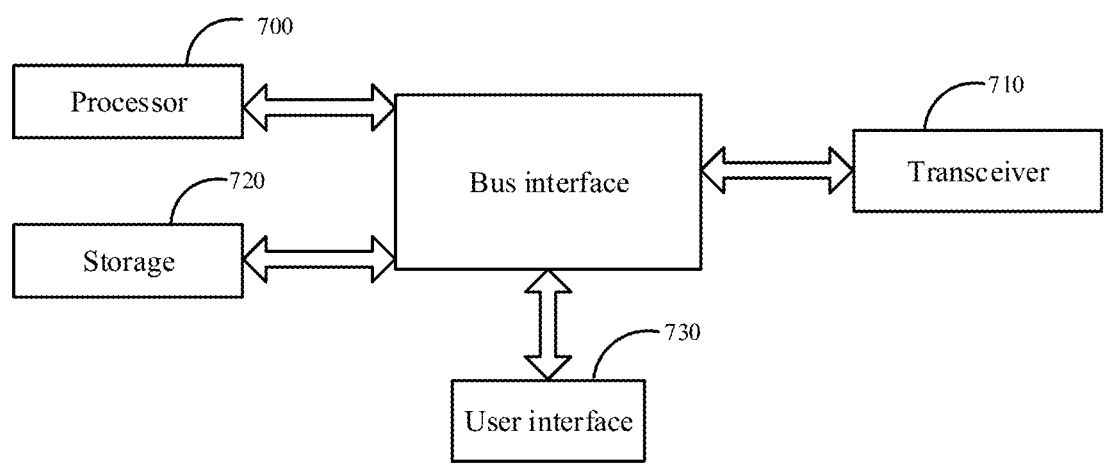
FIG. 7 is another structural schematic diagram of the terminal provided in some embodiments of the present disclosure.

Referring to FIG. 7, FIG. 7 shows a structure of a terminal. The terminal includes a processor 700, a transceiver 710, a storage 720, a user interface 730 and a bus interface.

The processor 700 is configured to read programs in the storage 720 to perform the following steps: determining a transmission manner for one or more uplink SRSs in a wideband system according to a configuration from a network side device, wherein the wideband system is configured with a plurality of basic parameters; and transmitting the one or more uplink SRSs to the network side device in the wideband system by using the transceiver 710 according to the transmission manner.

The transceiver 710 is configured to transmit data and receive data under a control of the processor 700.

In FIG. 7, the bus interface may include any number of buses and bridges connected together. Specifically, a plurality of processors such as the processor 700 and a plurality of storages such as the storage 720 are connected together. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 710 may include a plurality of elements such as receivers, transmitters, and units for communicating with other devices through a transmission medium. Directed to different terminals, the user interface 730 may also be an interface capable of being connected to external devices including, but not limited to, keypads, displays, speakers, microphones, joysticks, or the like.

The processor 700 takes charge of the bus interface and general processing. The storage 720 may store data used by the processor 700 when the processor 100 performs operations.

Optionally, the transmitting the one or more uplink SRSs to the network side device in the wideband system by using the transceiver 710 according to the transmission manner, includes: transmitting the one or more uplink SRSs to the network side device in one or more symbols in the wideband system by using the transceiver 710 according to the transmission manner.

Optionally, subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having the same subcarrier spacing at different frequency-domain positions.

Optionally, the above basic parameters include the subcarrier spacings.

Optionally, the configuration from the network side device may be configured by the network side device through a dynamic signaling, a high-layer semi-persistent signaling or in an implicit manner.

Optionally, the transmission manner may include transmission of the one or more uplink SRSs in a wideband, and the transmission manner may also include one or more of following (1) to (4).

(1) whether the one or more uplink SRSs are allowed to be transmitted simultaneously in one or more frequency bands configured with the plurality of basic parameters or not.

(2) the one or more uplink SRSs are only allowed to be transmitted in one or more frequency bands configured with one basic parameter.

(3) the one or more uplink SRSs are allowed to be transmitted in one or more frequency bands configured with the plurality of basic parameters.

(4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously.

Optionally, allowing the one or more uplink SRSs to be transmitted only in one or more frequency bands configured with one basic parameter, includes: allowing the one or more uplink SRSs to be transmitted in one or more frequency bands configured with the same basic parameter simultaneously or at different time points, wherein in a case that the one or more uplink SRSs are transmitted at different time points, a time relationship among transmissions of the one or more uplink SRSs in the one or more frequency bands is a default configuration for the system, or is informed by the network side device through a signaling; wherein sequences in which the one or more uplink SRSs are transmitted in the one or more frequency bands are the same or different.

Optionally, allowing the one or more uplink SRSs to be transmitted in one or more frequency bands configured with a plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among the transmissions of the one or more uplink SRSs in the one or more frequency bands is the default configuration for the system, or informed by the network side device through the signaling; wherein sequences in which the one or more uplink SRSs are transmitted in the one or more frequency bands are same or different.

Optionally, the above transmission manner is a transmission of the one or more uplink SRSs in sub-bands, and a size of each of the sub-bands is configured by the network side device, and one or more frequency bands configured with one basic parameter include one or more sub-bands.

Optionally, the transmission manner may include one or more of following (1) to (3).

(1) whether the one or more uplink SRSs are allowed to be transmitted by frequency-hopping among the frequency bands configured with different basic parameters or not.

(2) whether the one or more uplink SRSs are allowed to be transmitted by frequency-hopping among the frequency bands configured with the same basic parameter or not.

(3) sequences used when transmissions of the one or more uplink SRSs are frequency-hopped among frequency bands are same or different.

It should be noted that, the terminal in some embodiments of the present disclosure may be the terminal in the process embodiments of the present disclosure, and the terminal in the embodiments of the present disclosure may be implemented by the terminal of the present disclosure, and same technical effects may be achieved and repeated description is not provided herein.

Figure 8:
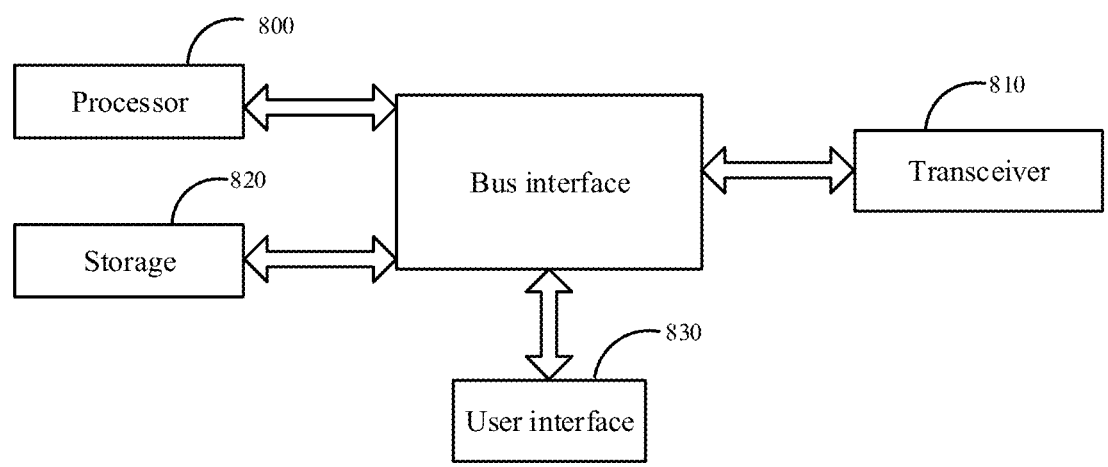
FIG. 8 is another structural schematic diagram of a network side device provided in some embodiments of the present disclosure.

Referring to FIG. 8, FIG. 8 shows a structure of a network side device. The network side device includes a processor 800, a transceiver 810, a storage 820, a user interface 830 and a bus interface.

The processor 800 is configured to read programs in the storage 820 to perform the following steps: transmitting a configuration to a terminal by using the transceiver 810 so that the terminal determines a transmission manner for the one or more uplink SRSs in a wideband system according to the configuration, wherein the wideband system is configured with a plurality of basic parameters; receiving, by using the transceiver 810, the one or more uplink SRSs transmitted by the terminal in the wideband system according to the transmission manner.

The transceiver 810 is configured to transmit data and receive data under a control of the processor 800.

In FIG. 8, the bus interface may include any number of buses and bridges connected together. Specifically, a plurality of processors such as the processor 800 and a plurality of storages such as the storage 820 are connected together. The bus interface may also cause any other circuits such as a peripheral circuit, a voltage regulator and a power management circuit to be connected together. The circuits are known in the art, and thus detailed description thereof are not further provided herein. The bus interface provides an interface. The transceiver 810 may include a plurality of elements such as receivers, transmitters, and units for communicating with other devices through a transmission medium. Directed to different terminal, the user interface 830 may also be an interface capable of being connected to external devices including, but not limited to, keypads, displays, speakers, microphones, joysticks, or the like.

The processor 800 takes charge of the bus interface and general processing. The storage 820 may store data used by the processor 800 when the processor 100 performs operations.

Optionally, the receiving the one or more uplink SRSs transmitted by the terminal in the wideband system according to the transmission manner, includes: receiving the one or more uplink SRSs transmitted by the terminal in one or more symbols in the wideband system according to the transmission manner.

Optionally, subcarrier spacings in the one or more uplink SRSs at different frequency-domain positions are the same; or the subcarrier spacings in the one or more uplink SRSs at different frequency-domain positions are different; or the one or more uplink SRSs are in one or more consecutive subcarriers having the same subcarrier spacing at different frequency-domain positions.

Optionally, the above basic parameters include the subcarrier spacings.

Optionally, the configuration from the network side device may be configured by the network side device through a dynamic signaling, a high-layer semi-persistent signaling or in an implicit manner.

Optionally, the transmission manner may include transmission of the one or more uplink SRSs in a wideband, and the transmission manner may also include one or more of following (1)-(4).

(1) whether the one or more uplink SRSs are allowed to be transmitted simultaneously in one or more frequency bands configured with the plurality of basic parameters or not.

(2) the one or more uplink SRSs are only allowed to be transmitted in one or more frequency bands configured with one basic parameter.

(3) the one or more uplink SRSs are allowed to be transmitted in one or more frequency bands configured with the plurality of basic parameters.

(4) the terminal transmits, by default, the one or more uplink SRSs in a frequency band configured with the plurality of basic parameters, transmitted in one or more frequency bands configured with one basis parameter, or transmitted in frequency bands configured with the plurality of basic parameters simultaneously.

Optionally, allowing the one or more uplink SRSs to be transmitted in one or more frequency bands configured with one basic parameter only, includes: allowing the one or more uplink SRSs to be transmitted in one or more frequency bands configured with the same basic parameter simultaneously or at different time points, wherein in a case that the one or more uplink SRSs are transmitted at different time points, a time relationship among transmissions of the one or more uplink SRSs in the one or more frequency bands is a default configuration for the system, or informed by the network side device through a signaling; wherein sequences in which the one or more uplink SRSs are transmitted in the one or more frequency bands are the same or different.

Optionally, allowing the one or more uplink SRSs to be transmitted in one or more frequency bands configured with the plurality of basic parameters, includes: allowing the one or more uplink SRSs to be transmitted in one or more frequency bands configured with different basic parameters simultaneously or at different time points, wherein in a case that the one or more uplink SRSs are transmitted at different time points, the time relationship among transmissions of the one or more uplink SRSs in the one or more frequency bands is the default configuration for the system, or informed by the network side device through a signaling; wherein sequences in which the one or more uplink SRSs are transmitted in the one or more frequency bands are the same or different.

Optionally, the above transmission manner is a transmission of the one or more uplink SRSs in sub-bands, and a size of each of the sub-bands is configured by the network side device, and one or more frequency bands configured with one basic parameter include one or more sub-bands.

Optionally, the transmission manner may further include one or more of following (1) to (3).

(1) whether the one or more uplink SRSs may be transmitted by frequency-hopping among frequency bands configured with different basic parameters or not.

(2) whether the one or more uplink SRSs may be transmitted by frequency-hopping among the frequency bands configured with the same basic parameter or not.

(3) sequences used when transmissions of the one or more uplink SRSs are frequency-hopped among frequency bands are same or different.

It should be noted that, the network side device 600 in some embodiments of the present disclosure may be the network side device in the process embodiments of the present disclosure, and the network side device in the embodiments of the present disclosure may be implemented by the network side device 600 of the present disclosure, and same technical effects may be achieved and repeated description is not provided herein.

It should be understood that, in the several embodiments provided in the present disclosure, the disclosed device and method can be implemented in other ways. The apparatus embodiments described above are only illustrative. For example, a division of a unit may be only one logically functional division. There may be other divisions in actual implementations, e.g. multiple units and components can be combined or integrated in another system, or some features may be omitted or not executed. Additionally, couplings, or direct couplings, or communication connections between displayed or discussed components may be via some interfaces, and indirect couplings or communication connections between devices or units may be electrical, mechanical or other forms of connections.

The functional units described in the embodiments of the present disclosure may be integrated in one processing units or may be separated physically, or two or more of the units may be integrated in one unit. The above integrated units may be implemented by hardware, or a functional unit including hardware and software.

The above integrated units implemented by the functional unit including software may be stored in a computer readable storage medium. The functional units including software stored in the storage medium may include instructions for causing a computing device (which may be a personal computer, a server, a network device or the like) to perform some or parts of the method of the embodiments of the present disclosure. The storage medium may include mediums capable of storing programs and codes, such as a USB disk, a removable disk, a Read Only Memory (ROM), a Random Access Memory (RAM), a Magnetic Disk, a Compact Disk, or the like.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A method for transmitting one or more uplink Sounding Reference Signals (SRSs), comprising:
   determining a transmission manner for the one or more uplink SRSs in a wideband system by a terminal according to a configuration from a network side device, wherein the wideband system is configured with a plurality of basic parameters, the plurality of basic parameters comprise subcarrier spacings;
   transmitting the one or more uplink SRSs to the network side device in the wideband system by the terminal according to the transmission manner,
   wherein
   different subcarrier spacings correspond to different lengths of symbols for transmitting the one or more uplink SRSs,
   the transmission manner comprises transmissions of the one or more uplink SRSs in a wideband, and the transmission manner further comprises one or more of following (1) to (4):
   (1) whether the one or more uplink SRSs are allowed to be transmitted simultaneously in one or more frequency bands configured with the plurality of basic parameters or not;
   (2) the one or more uplink SRSs are only allowed to be transmitted in one or more frequency bands configured with one basic parameter;
   (3) the one or more uplink SRSs are transmitted in one or more frequency bands configured with the plurality of basic parameters;
   (4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously;
   or,
   the transmission manner comprises one or more of following (1) to (3):
   (1) whether the one or more uplink SRSs are allowed to be transmitted by frequency-hopping among the frequency bands configured with different basic parameters or not;
   (2) whether the one or more uplink SRSs are allowed to be transmitted by frequency-hopping among the frequency bands configured with a same basic parameter or not;
   (3) sequences used when transmissions of the one or more uplink SRSs are frequency-hopped among frequency bands are same or different.

2. The method according to claim 1, wherein
   the configuration is configured by the network side device through a dynamic signaling, a high-layer semi-persistent signaling or in an implicit manner.

3. The method according to claim 1, wherein,
   the transmission manner is transmission of the one or more uplink SRSs in sub-bands, and a size of each of the sub-bands is configured by the network side device, and one or more frequency bands configured with one basic parameter comprise one or more sub-bands.

4. The method according to claim 1, wherein, subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having a same subcarrier spacing at different frequency-domain positions.

5. A terminal, comprising:
   a processor, and
   a transceiver, configured to receive and transmit data under a control of the processor;
   wherein the processor is configured to perform the method according to claim 1.

6. The terminal according to claim 5, wherein
   the configuration is configured by the network side device through a dynamic signaling, a high-layer semi-persistent signaling or in an implicit manner.

7. The terminal according to claim 5, wherein
   the transmission manner is transmission of the one or more uplink SRSs in sub-bands, and a size of each of the sub-bands is configured by the network side device, and one or more frequency bands configured with one basic parameter comprise one or more sub-bands.

8. The terminal according to claim 5, wherein subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having a same subcarrier spacing at different frequency-domain positions.

9. A method for transmitting one or more uplink Sounding Reference Signals (SRSs), comprising:
   transmitting a configuration to a terminal by a network side device, so that the terminal determines a transmission manner for the one or more uplink SRSs in a wideband system according to the configuration, wherein the wideband system is configured with a plurality of basic parameters, the plurality of basic parameters comprise subcarrier spacings;
   receiving, by the network side device, the one or more uplink SRSs transmitted by the terminal in the wideband system according to the transmission manner, wherein, different subcarrier spacings correspond to different lengths of symbols for transmitting the one or more uplink SRSs, the transmission manner comprises transmissions of the one or more uplink SRSs in a wideband, and the transmission manner further comprises one or more of following (1) to (4):
(1) whether the one or more uplink SRSs are allowed to be transmitted simultaneously in one or more frequency bands configured with the plurality of basic parameters or not;
(2) the one or more uplink SRSs are only allowed to be transmitted in one or more frequency bands configured with one basic parameter;
(3) the one or more uplink SRSs are transmitted in one or more frequency bands configured with the plurality of basic parameters;
(4) the terminal transmits, by default, the one or more uplink SRSs in a frequency band configured with the plurality of basic parameters, transmitted in one or more frequency bands configured with one basic parameter, or transmitted in frequency bands configured with the plurality of basic parameters simultaneously;

or, the transmission manner comprises one or more of following (1) to (3):
(1) whether the one or more uplink SRSs are allowed to be transmitted by frequency-hopping among the frequency bands configured with different basic parameters or not;
(2) whether the one or more uplink SRSs are allowed to be transmitted by frequency-hopping among the frequency bands configured with a same basic parameter or not;
(3) sequences used when transmissions of the one or more uplink SRSs are frequency-hopped among frequency bands are same or different.

10. The method according to claim 9, wherein,
the configuration is configured by the network side device through a dynamic signaling, a high-layer semi-persistent signaling or in an implicit manner.

11. The method according to claim 9, wherein,
the transmission manner is transmission of the one or more uplink SRSs in sub-bands, and a size of each of the sub-bands is configured by the network side device, and one or more frequency bands configured with one basic parameter comprise one or more sub-bands.

12. The method according to claim 9, wherein, subcarrier spacings in the one or more uplink SRSs at different frequency-domain positions are same; or the subcarrier spacings in the one or more uplink SRSs at different frequency-domain positions are different; or the one or more uplink SRSs are in one or more consecutive subcarriers having a same subcarrier spacing at different frequency-domain positions.

13. A network side device, comprising:
a processor, and
a transceiver, configured to receive and transmit data under a control of the processor;
wherein the processor is configured to perform the method according to claim 9.

14. The network side device according to claim 13, wherein,
the configuration is configured by the network side device through a dynamic signaling, a high-layer semi-persistent signaling or in an implicit manner.

15. The network side device according to claim 13, wherein,
the transmission manner is transmission of the one or more uplink SRSs in sub-bands, and a size of each of the sub-bands is configured by the network side device, and one or more frequency bands configured with one basic parameter comprise one or more sub-bands.

16. The network side device according to claim 13, wherein, subcarrier spacings of the one or more uplink SRSs at different frequency-domain positions are same; or the subcarrier spacings of the one or more uplink SRSs at different frequency-domain positions are different; or the one or more uplink SRSs are in one or more consecutive subcarriers having a same subcarrier spacing at different frequency-domain positions.

* * * * *